(12) United States Patent
Rosso

(10) Patent No.: US 7,651,134 B2
(45) Date of Patent: Jan. 26, 2010

(54) DOUBLE SEATBELT ANCHOR BRACKET

(75) Inventor: Jeffery Rosso, Imlay City, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 79 days.

(21) Appl. No.: 11/375,470

(22) Filed: Mar. 14, 2006

(65) Prior Publication Data

US 2007/0216148 A1  Sep. 20, 2007

(51) Int. Cl.
*B60R 22/18* (2006.01)
*B60R 22/22* (2006.01)

(52) U.S. Cl. .................... 280/801.1; 297/468; 248/500

(58) Field of Classification Search ............. 280/801.1; 297/482, 468; 296/68.1; 248/505, 506, 499, 248/500

See application file for complete search history.

(56) References Cited

U.S. PATENT DOCUMENTS

| 3,440,602 | A | * | 4/1969 | Frig .................... 340/457.1 |
| 4,331,349 | A | * | 5/1982 | Funahashi ............ 280/801.1 |
| 4,770,459 | A |   | 9/1988 | Nakaiwa et al. |
| 4,915,451 | A |   | 4/1990 | Forget et al. |
| 4,928,992 | A |   | 5/1990 | Qvint et al. |
| 4,978,097 | A | * | 12/1990 | Froutzis ............... 248/503.1 |
| 5,403,070 | A |   | 4/1995 | Jahn et al. |
| 5,415,430 | A | * | 5/1995 | Valasin ................ 280/801.1 |
| 5,863,071 | A |   | 1/1999 | Li-Calso |
| 6,126,200 | A | * | 10/2000 | Bell et al. ............ 280/801.1 |
| 6,158,774 | A |   | 12/2000 | Mink |
| 6,224,132 | B1 | * | 5/2001 | Neale ..................... 296/68.1 |
| 6,447,010 | B1 | * | 9/2002 | Curtis et al. ........... 280/801.1 |
| 6,485,055 | B1 | * | 11/2002 | Swayne et al. ........ 280/801.1 |
| 6,623,037 | B2 |   | 9/2003 | Ritters et al. |
| 7,063,389 | B2 | * | 6/2006 | Kennedy, Sr. ............... 297/483 |
| 2004/0262979 | A1 | | 12/2004 | Suzuki et al. |
| 2006/0017274 | A1 | * | 1/2006 | Bronner et al. ......... 280/801.1 |

FOREIGN PATENT DOCUMENTS

| JP | 2002-362306 | * | 12/2002 |
| WO | WO 02/38423 | * | 5/2002 |

* cited by examiner

*Primary Examiner*—Paul N. Dickson
*Assistant Examiner*—George D. Spisich
(74) *Attorney, Agent, or Firm*—Tarolli, Sundheim, Covell & Tummino LLP

(57) ABSTRACT

An apparatus (12) includes a primary housing (20) constructed from sheet metal by stamping, a primary inflation fluid source (100), a secondary housing (70) constructed from sheet metal by stamping, and a secondary inflation fluid source (200). The primary inflation fluid source (100) is located in the primary housing (20) and is actuatable to effect a primary flow of inflation fluid out of the primary housing to inflate the inflatable device (14). The secondary housing (70) is disposed within the primary housing (20). The secondary inflation fluid source (200) is located in the secondary housing (70) and is actuatable to affect a secondary flow of inflation fluid to supplement the primary flow of inflation fluid. The secondary housing (70) has a first portion (77) that moves at least partially out of engagement with a second portion (74) of the secondary housing (70) when the secondary inflation fluid source is actuated.

13 Claims, 3 Drawing Sheets

US 7,651,134 B2

DOUBLE SEATBELT ANCHOR BRACKET

FIELD OF THE INVENTION

The present invention relates to an apparatus for helping to protect an occupant of a vehicle. In particular, the present invention relates to vehicle seatbelts and seatbelt systems.

BACKGROUND OF THE INVENTION

There are various known apparatuses for helping to protect occupants of a vehicle. For example, it is known to provide a seatbelt for helping to secure or restrain an occupant in a vehicle. Seatbelts may be secured or anchored to the vehicle in a variety of manners, such as by brackets connected to the vehicle with threaded fasteners.

SUMMARY OF THE INVENTION

The present invention relates to an apparatus for helping to protect occupants seated next to each other in seating of a vehicle. A first seatbelt helps protect an occupant seated in a first portion of the seating. A second seatbelt helps protect an occupant seated in a second portion of the seating, the second seating portion being positioned adjacent the first seating portion. An anchor bracket secures the first and second seatbelts in the vehicle. The anchor bracket includes a first aperture for receiving the first seatbelt, a second aperture for receiving the second seatbelt, and a third aperture for receiving a fastener for securing the anchor bracket to the vehicle. The first, second, and third apertures are aligned along a longitudinal centerline of the anchor bracket.

The present invention also relates to an apparatus for helping to protect occupants seated next to each other in seating of a vehicle. A first seatbelt helps protect an occupant seated in a first portion of the seating. A second seatbelt helps protect an occupant seated in a second portion of the seating, the second seating portion being positioned adjacent the first seating portion. An anchor bracket secures the first and second seatbelts in the vehicle. The anchor bracket includes a first aperture for receiving the first seatbelt, a second aperture for receiving the second seatbelt, and a third aperture for receiving a fastener for securing the anchor bracket to the vehicle. The centers of the first, second, and third apertures are centered on a longitudinal centerline that bisects the anchor bracket.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DESCRIPTION OF EMBODIMENTS

Figure 1:
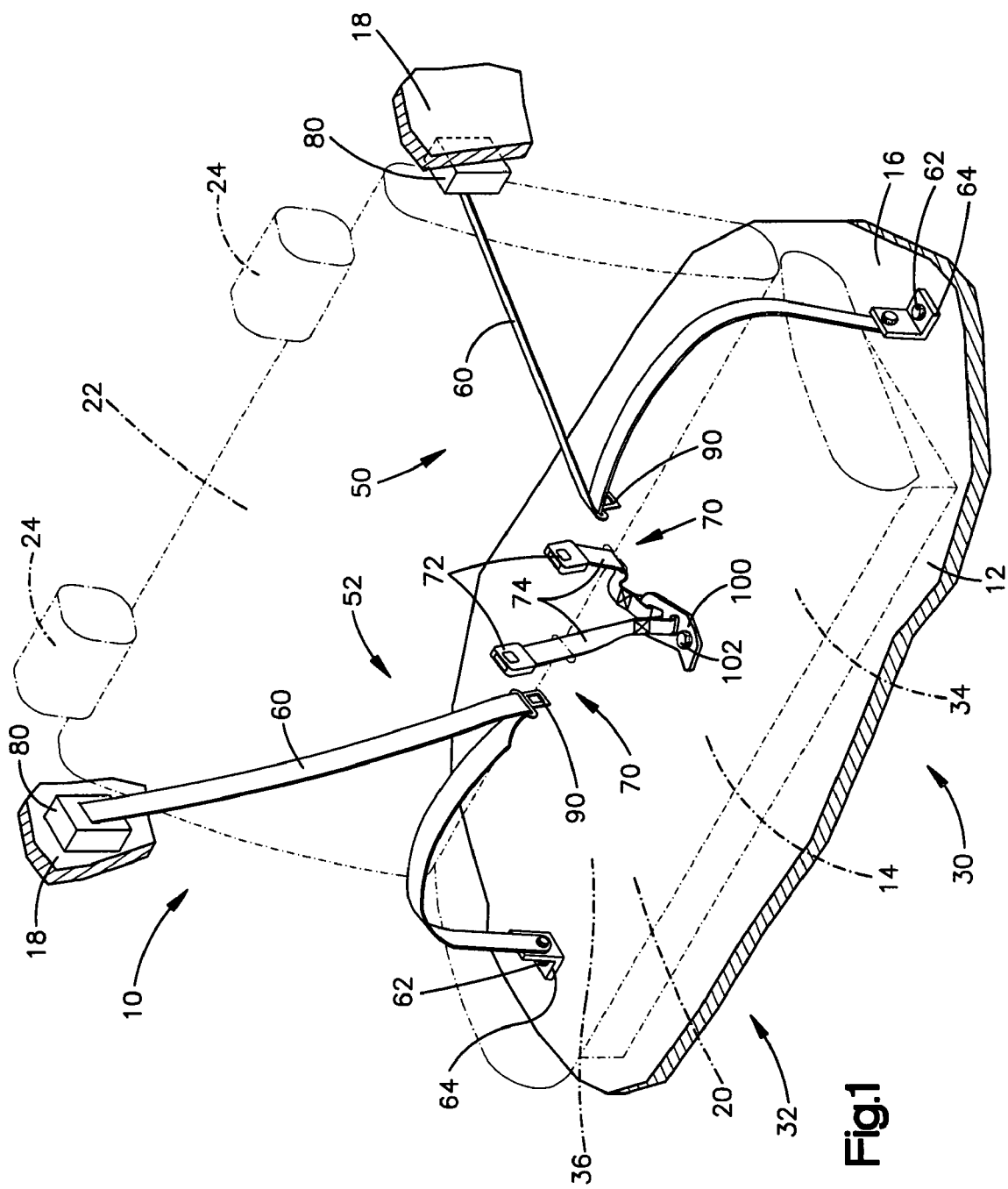
FIG. 1 is a schematic view illustrating a vehicle seatbelt system according to a first embodiment of the present invention.

As representative of the present invention, FIG. 1 illustrates a seatbelt system 10 for helping to protect occupants (not shown) of a vehicle 12. The seatbelt system 10 illustrated in FIG. 1 is implemented in a passenger row of seating 14, such as second or third row seating. The seatbelt system 10 could, however, be implemented in any row, such as a first or front row vehicle seating (not shown).

The seating 14 is supported in the vehicle 12 by vehicle structure 16, such as a floor pan. The seating 14 includes a base cushion portion 20 and a backrest portion 22. The seating 14 may also include headrests 24. In the embodiment of FIG. 1, the seating 14 is bench-style seating in which the base cushion portion 20 and backrest portion 22 span the width of the vehicle 12 from a driver side 30 of the vehicle to a passenger side 32 of the vehicle. The seating 14 could have an alternative configuration, such as a split bench or bucket configuration.

The seating 14 illustrated in FIG. 1 is configured for two passengers (not shown). The seating 14 includes driver side seating 34 and passenger side seating 36. The driver side seating 34 includes portions of the base cushion portion 20 and backrest portion 22 positioned on the driver side 30 of the vehicle 12. The passenger side seating 36 includes portions of the base cushion portion 20 and backrest portion 22 positioned on the passenger side 32 of the vehicle 12.

The seatbelt system 10 includes a driver side seatbelt 50 for helping to protect an occupant of the driver side seating 34 and a passenger side seatbelt 52 for helping to protect an occupant of the passenger side seating 36. Each of the driver side and passenger side seatbelts 50 and 52 of the seatbelt system 10 includes a length of seatbelt webbing 60. One end of the seatbelt webbing 60 is anchored to the vehicle structure 16, e.g., to the floor pan, at an anchor point 62 located adjacent the seating 14. The anchor point 62 may comprise, for example, a bracket 64 fastened to the vehicle structure 16 by a threaded fastener.

Each of the driver side and passenger side seatbelts 50 and 52 of the seatbelt system 10 also includes a buckle assembly 70. As shown in FIG. 1, the buckle assemblies 70 are located generally central to the seating 14. The driver side buckle assembly 70 is located on a side of the driver side seating 34 opposite the anchor point 62 of the driver side seatbelt webbing 60. Similarly, the passenger side buckle assembly 70 is located on a side of the passenger side seating 36 opposite the anchor point 62 of the passenger side seatbelt webbing 60.

Each buckle assembly 70 includes a buckle 72 and a strap member 74, such as a length of webbing, that has a first end secured to the buckle. The seatbelt system 10 includes an anchor bracket 100 for helping to secure the buckle assemblies 70 to the vehicle 12. The anchor bracket 100 is secured to the vehicle by means 102, such as one or more threaded fasteners (e.g., bolts). Second ends of the strap members 74, opposite their respective first ends, extend through and are connected to the anchor bracket 100 to secure the buckle assemblies 70 to the vehicle 12.

The end of each length of seatbelt webbing 60 opposite its anchor point 62 is attached to a retractor 80 secured to the vehicle 12 adjacent the same side of the seating 14 as the anchor point 62. The retractor 80 may, for example, be connected to the side structure 18 of the vehicle 12 at a location such as a pillar of the vehicle. Intermediate its ends, each length of seatbelt webbing 60 passes through a tongue assembly 90.

When the seatbelt system 10 is not in use, the seatbelt webbing 60 is wound on the retractor 80 in a known manner. To use the driver side seatbelt 50, the driver side tongue assembly 90 is moved across the driver side seating 34 and connected with the driver side buckle 72. Similarly, to use the passenger side seatbelt 52, the passenger side tongue assembly 90 is moved across the passenger side seating 36 and connected with the passenger side buckle 72.

According to the present invention, the anchor bracket 100 comprises a single bracket that connects two seatbelts, e.g., the driver side and passenger side seatbelts 50 and 52, to the vehicle 12. In the embodiment of FIG. 1, the anchor bracket 100 connects the strap members 74 of the driver side and passenger side buckle assemblies 70 to the vehicle structure 16 (e.g., to the floor pan).

Figure 2:
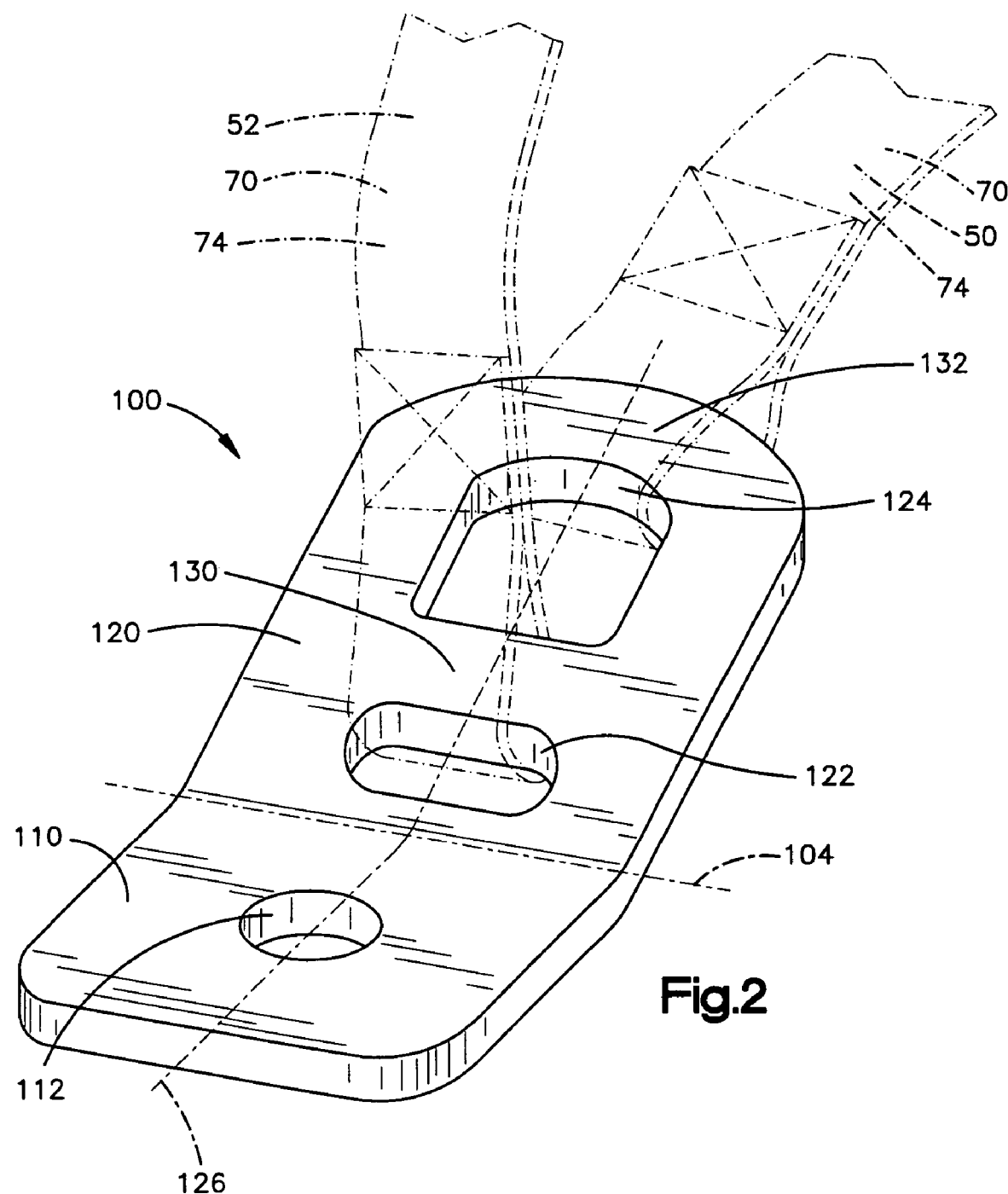
FIG. 2 is a schematic view of a portion of the vehicle seatbelt system of FIG. 1.

The anchor bracket 100 is illustrated in greater detail in FIG. 2. Referring to FIG. 2, the anchor bracket 100 is constructed of a single monolithic homogeneous piece of material. The material used to construct the anchor bracket 100 is a durable high-strength material, such as metal (e.g., hardened steel). The anchor bracket 100 may be manufactured using known metalworking procedures or techniques, such as stamping, forging, cutting, machining, or a combination of these techniques. For example, the anchor bracket 100 may be constructed from a steel sheet or plate stock material and may be manufactured by stamping the material in a die and bending the material to the illustrated form. The anchor bracket 100 may thus be formed from the stock material using a minimal number of steps.

Referring to FIG. 2, the anchor bracket 100 has an overall generally rectangular configuration with three generally flat sides or edges, a side or edge that has an arched or curved configuration, and rounded corners at the intersections of the edges. The anchor bracket 100 is bent or otherwise deformed about an axis 104 to define a base portion 110 and flange portion 120 that extend at an angle relative to each other.

The base portion 110 includes a generally cylindrical fastener aperture 112 for receiving the fastener 102 used to secure the bracket 100 to the vehicle 12 (see FIG. 1). The flange portion 120 includes first and second seatbelt apertures 122 and 124, respectively. The seatbelt apertures 122 and 124 may have any configuration suited to provide the structure and function described herein. In the embodiment illustrated in FIG. 2, the first seatbelt aperture 122 has a generally oblong, elliptical or oval-shaped configuration. The second seatbelt aperture 124 has a generally rectangular configuration with three generally flat sidewalls, a sidewall that has an arched or curved configuration, and rounded corners at the intersections of the sidewalls. The area of the second seatbelt aperture 124 is larger than the area of the first seatbelt aperture 122. For example, in the embodiment of FIG. 2, the area of the second seatbelt aperture 124 is about twice the area of the first seatbelt aperture 122.

According to the present invention, the fastener aperture 112 and seatbelt apertures 122 and 124 are centered on and aligned along a longitudinal axis or centerline 126 of the anchor bracket 100. As shown in FIG. 2, the centerline 126 extends along the bent contour of the anchor bracket 100. The centerline 126 is thus centered on and extends longitudinally through the base portion 110 and is centered on and extends longitudinally through the flange portion 120. The centerline 126 bisects the anchor bracket 100 and the apertures 112, 122, and 124. The centerline 126 extends parallel to the length of the anchor bracket 100, i.e., parallel to the longitudinal edges of the bracket, and through the arched or curved edge of the bracket. Throughout its length, the centerline 126 is perpendicular to the axis 102. Because of the bent configuration of the anchor bracket 100, the portion of the centerline 126 extending through the flange portion 120 may extend more vertically or with a larger vertical component than the portion of the centerline extending through the base portion 110.

The alignment of the apertures 112, 122, and 124 along the centerline 126 helps minimize the size of the anchor bracket 100. By aligning the apertures 112, 122, and 124 in this manner, the width dimension, measured perpendicular to the centerline 126, is reduced. This helps reduce the amount of material used to construct the anchor bracket 100 and the number of parts used to secure the seatbelts 50 and 52 (FIG. 1) to the vehicle 12.

The seatbelt apertures 122 and 124 help define first and second seatbelt beams 130 and 132, respectively. The first seatbelt beam 130 is positioned between the seatbelt apertures 122 and 124 and has a generally rectangular configuration defined by the parallel sidewalls of the seatbelt apertures. The second seatbelt beam 132 is positioned adjacent the second seatbelt aperture 124 opposite the first seatbelt beam 130 and has a curved configuration defined by the curved edge of the anchor bracket 100 and the curved sidewall of the second seatbelt aperture.

In the embodiment of FIG. 1, the anchor bracket 100 provides a single anchor point for securing the buckle assemblies 70 of the driver side and passenger side seatbelts 50 and 52 to the vehicle 12. As best shown in FIG. 2, the strap member 74 of the passenger side seatbelt 52 is secured to the first seatbelt beam 130 of the anchor bracket 100 and the strap member of the driver side seatbelt 50 is secured to the second seatbelt beam 132 of the anchor bracket.

The strap member 74 of the passenger side seatbelt 52 extends through the first seatbelt aperture 122, wraps around the first seatbelt beam 130, and is secured to itself, e.g., via stitching, to connect the strap member to the first seatbelt beam. Similarly, the strap member 74 of the driver side seatbelt 50 extends through the second seatbelt aperture 124, wraps around the second seatbelt beam 132, and is secured to itself, e.g., via stitching, to connect the strap member to the second seatbelt beam. The strap members 74 could, however, be secured to the anchor bracket 100 in an alternative manner. For example, the first and second seatbelt apertures 122 and 124 could be configured to receive threaded fasteners that extend through the strap members 74 to secure the strap members to the anchor bracket.

As shown in FIG. 2, when the strap members 74 are secured to the anchor bracket 100, both strap members extend through the second seatbelt aperture 124 whereas only one strap extends through the first seatbelt aperture 122. Advantageously, the second seatbelt aperture 124, having a larger area (e.g., about double the area) than the first seatbelt aperture 122, is configured to accommodate both strap members 74.

As shown in FIG. 1, the strap members 74 of the driver and passenger side seatbelts 50 and 52 are configured to place the buckles 72 in a position readily accessible by an occupant seated on the vehicle seating 14. This may be done, for example, by configuring the seatbelts 50 and 52 to extend either through openings in the base cushion portion 20 of the seating 14 or between the base cushion portion and the backrest portion 22 of the seating. The curved configuration of the second seatbelt beam 132 (see FIG. 2) may further facilitate this by allowing the associated strap member 74 to pivot or slide along its curved surfaces to a desired orientation.

Also, the angle between the base portion 110 and flange portion 120 is selected to place the flange portion 120 in the load plane of the strap members 74 of the seatbelts 50 and 52. By "in the load plane," it is meant that the flange portion 120 is configured to extend along a plane that is generally coincident with the directions in which the strap members 74 are loaded during normal usage. By doing this, the flange portion 120 is subjected to forces that are primarily tensile in nature, i.e., forces that are directed generally along the plane of the flange portion 120. This takes advantage of relatively high tensile strength properties of the material used to construct the flange portion 120.

Figure 3:
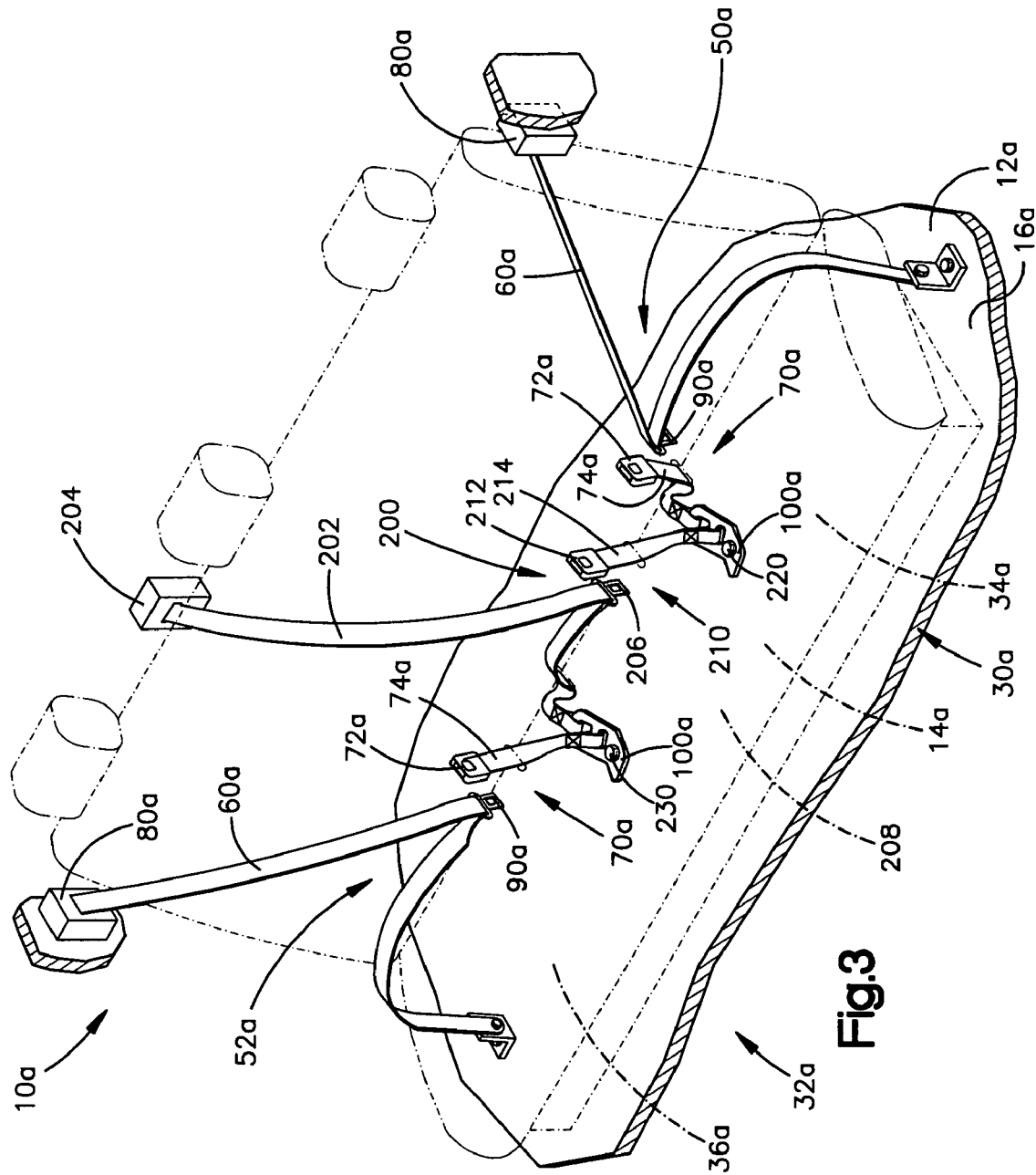
FIG. 3 is a schematic view illustrating a vehicle seatbelt system according to a second embodiment of the present invention.

A second embodiment of the present invention is illustrated in FIG. 3. The second embodiment of the invention is similar to the first embodiment of the invention illustrated in FIGS. 1 and 2. Accordingly, numerals similar to those of FIGS. 1 and 2 will be utilized in FIG. 3 to identify similar components, the suffix letter "a" being associated with the numerals of FIG. 3 to avoid confusion.

Referring to FIG. 3, the vehicle seating 14a is configured for three passenger seating, i.e., driver side seating 34a, passenger side seating 36a, and middle seating 208. In this configuration, a seatbelt system 10a includes a first or driver side seatbelt 50a, a second or passenger side seatbelt 52a and a third or middle seatbelt 200. The driver side seatbelt 50a has a configuration similar or identical to that described above in regard to the driver side seatbelt 50 of the first embodiment of FIGS. 1 and 2 and is implemented on a driver side 30a of the vehicle 12a. The passenger side seatbelt 52a has a configuration similar or identical to that described above in regard to the passenger side seatbelt 52 of the first embodiment of FIGS. 1 and 2 and is implemented on a passenger side 32a of the vehicle 12a. In the embodiment of FIG. 3, the third or middle seatbelt 200 is configured to help protect an occupant (not shown) seated in the middle of the vehicle seating 14a, between driver side 30a and passenger side 32a seated occupants of the vehicle 12a.

The middle seatbelt 200 has a shoulder/lap belt configuration similar or identical to that described above in regard to the driver and passenger side seatbelts of the first embodiment of FIGS. 1 and 2. The middle seatbelt 200 could, however, have an alternative configuration, such as a lap belt only configuration.

The middle seatbelt 200 includes a length of seatbelt webbing 202. One end of the seatbelt webbing 202 is anchored to the vehicle structure 16a beneath the seating 14a. An opposite end of the belt webbing is attached to a retractor 204. Intermediate its ends, the seatbelt webbing 202 passes through a tongue assembly 206. The middle seatbelt 200 also includes a buckle assembly 210. The buckle assembly 210 includes a buckle 212 and a strap member 214, such as a length of seatbelt webbing, that has a first end secured to the buckle.

In the second embodiment, the seatbelt system 10a includes two anchor brackets 100a for helping to secure the buckle assemblies 70a and 210 to the vehicle 12a. A first anchor bracket identified at 220 is secured to the vehicle structure 16a at or proximate the interface between the driver side seating 34a and middle seating 208. A second anchor bracket identified at 230 is secured to the vehicle structure 16a at or proximate the interface between the passenger side seating 36a and middle seating 208.

The first anchor bracket 220 secures the strap member 214 of the middle buckle assembly 210 and the strap member 74a of the driver side buckle assembly 70a to the vehicle 12a. The strap members 214 and 74a extend through and are connected to the first anchor bracket 220 to secure the middle buckle assembly 210 and driver side buckle assembly 70a to the vehicle 12a. The strap members 214 and 74a may be connected to the first anchor bracket 220 in a manner similar or identical to that described above in regard to the strap members 74 of the first embodiment of FIGS. 1 and 2, such as by stitching portions of the strap members onto themselves.

The second anchor bracket 230 secures the strap member 74a of the passenger side buckle assembly 72a and the seatbelt webbing 202 to the vehicle 12a. The seatbelt webbing 202 and strap member 74a extend through and are connected to the second anchor bracket 230 to secure the seatbelt webbing 202 and passenger side buckle assembly 72a to the vehicle 12a. The strap member 214 and seatbelt webbing 202 may be connected to the second anchor bracket 230 in a manner similar or identical to that described above in regard to the strap members 74 of the first embodiment of FIGS. 1 and 2, such as by stitching portions of the strap member and seatbelt webbing onto themselves.

When the seatbelt system 10a is not in use, the seatbelt webbing 60a and 202 is wound on the retractors 80a and 204 in a known manner. To use the driver side seatbelt 50a, the tongue assembly 90a is moved across the driver side seating 34a and connected with the driver side buckle 70a. To use the passenger side seatbelt 52a, the tongue assembly 90a is moved across the passenger side seating 36a and connected with the passenger side buckle 70a. To use the middle seatbelt 200, the tongue assembly 206 is moved across the middle seating 208 and connected with the middle buckle 212.

The anchor brackets 220 and 230 have configurations and material constructions similar or identical to those described above in regard to the anchor bracket 100 of the first embodiment of FIGS. 1 and 2. Accordingly, the strap member 214 of the middle buckle assembly 210 extends through a first seatbelt aperture and extends around and is secured to a first seatbelt beam of the first anchor bracket 220. The strap member 74a of the driver side buckle assembly 70a extends through a second seatbelt aperture and extends around and is secured to a second seatbelt beam of the first anchor bracket 220. The seatbelt webbing 202 of the middle seatbelt 200 extends through a first seatbelt aperture and extends around and is secured to a first seatbelt beam of the second anchor bracket 230. The strap member 74a of the passenger side buckle assembly 70a extends through a second seatbelt aperture and extends around and is secured to a second seatbelt beam of the second anchor bracket 230.

The seatbelt webbing 202 and strap members 214 and 74a are connected to their respective anchor brackets 100a in a manner similar or identical to that described above in regard to the embodiment of FIGS. 1 and 2. For example, the seatbelt webbing 202 and strap members 214 and 74a may be wrapped around their respective seatbelt beams, folded onto themselves, and stitched together.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for helping to protect occupants seated next to each other in seating of a vehicle, the apparatus comprising:

a first seatbelt for helping to protect an occupant seated in a first portion of the seating;

a second seatbelt for helping to protect an occupant seated in a second portion of the seating, the second seating portion being positioned adjacent the first seating portion; and an anchor bracket for securing the first and second seatbelts in the vehicle, the anchor bracket comprising a first aperture for receiving the first seatbelt, a second aperture for receiving the second seatbelt, and a third aperture for receiving a fastener for securing the anchor bracket to the vehicle, the first, second, and third apertures being aligned along a longitudinal centerline of the anchor bracket, the first aperture helping to define a first seatbelt beam of the anchor bracket, the first seatbelt having a portion that extends around the first seatbelt beam to secure the first seatbelt to the anchor bracket, the second aperture helping to define a second seatbelt beam of the anchor bracket, the second seatbelt having a portion that extends around the second seatbelt beam to secure the second seatbelt to the anchor bracket, the anchor bracket including a first surface and a second surface, the first, second, and third apertures extending through the first and second surfaces, the first aperture being positioned between the second aperture and the third aperture.

2. The apparatus recited in claim 1, wherein each of the first and second seatbelts comprises:
a tongue assembly;
a length of seatbelt webbing to which the tongue assembly is secured;
a buckle for receiving a tongue member of the tongue assembly; and
a tether member to which the buckle is secured;
one of the seatbelt webbing and the tether member of the first seatbelt extending through the first aperture and being secured to the anchor bracket, one of the seatbelt webbing and the tether member of the second seatbelt extending through the second aperture and being secured to the anchor bracket.

3. The apparatus recited in claim 2, wherein the one of the seatbelt webbing and the tether member of the first seatbelt includes the tether member of the first seatbelt and the one of the seatbelt webbing and the tether member of the second seatbelt includes the tether member of the second seatbelt, the first aperture helping to define a portion of the anchor bracket that secures the tether member associated with the buckle of the first seatbelt to the vehicle, and the second aperture helping to define a portion of the anchor bracket that secures the tether member associated with the buckle of the second seatbelt to the vehicle.

4. The apparatus recited in claim 2, wherein the one of the seatbelt webbing and the tether member of the first seatbelt includes the seatbelt webbing of the first seatbelt and the one of the seatbelt webbing and the tether member of the second seatbelt includes the tether member of the second seatbelt, the first aperture helping to define a portion of the anchor bracket that secures the seatbelt webbing associated with the tongue assembly of the first seatbelt to the vehicle, and the second aperture helping to define a portion of the anchor bracket that secures the tether member associated with the buckle of the second seatbelt to the vehicle.

5. The apparatus recited in claim 1, wherein the second seatbelt beam has an arched configuration.

6. The apparatus recited in claim 1, wherein the anchor bracket includes a base portion and a flange portion that extends at an angle to the base portion, the first and second apertures extending through the flange portion.

7. The apparatus recited in claim 6, wherein the third aperture extends through the base portion.

8. The apparatus recited in claim 6, wherein the angle between the base portion and flange portion is selected such that the flange portion extends along a load plane of the first and second seatbelts.

9. The apparatus recited in claim 1, wherein the first, second, and third apertures are centered on the longitudinal centerline of the anchor bracket.

10. The apparatus recited in claim 1, wherein the longitudinal centerline extends along a contour of the anchor bracket and intersects each of the first, second, and third apertures only once.

11. An apparatus for helping to protect occupants seated next to each other in seating of a vehicle, the apparatus comprising;
a first seatbelt for helping to protect an occupant seated in a first portion of the seating;
a second seatbelt for helping to protect an occupant seated in a second portion of the seating, the second seating portion being positioned adjacent the first seating portion; and
an anchor bracket for securing the first and second seatbelts in the vehicle, the anchor bracket comprising a first aperture for receiving the first seatbelt, a second aperture for receiving the second seatbelt, and a third aperture for receiving a fastener for securing the anchor bracket to the vehicle, the first, second, and third apertures being aligned along a longitudinal centerline of the anchor bracket
wherein the second aperture of the anchor bracket has an area larger than an area of the first aperture of the anchor bracket, the second aperture being configured to receive both the first and second seatbelts, the first aperture being configured to receive the first seatbelt only.

12. An apparatus for helping to protect occupants seated next to each other in seating of a vehicle, the apparatus comprising:
a first seatbelt for helping to protect an occupant seated in a first portion of the seating;
a second seatbelt for helping to protect an occupant seated in a second portion of the seating, the second seating portion being positioned adjacent the first seating portion; and
a one-piece anchor bracket for securing the first and second seatbelts in the vehicle, the anchor bracket comprising a first aperture for receiving the first seatbelt, a second aperture for receiving the second seatbelt, and a third aperture for receiving a fastener for securing the anchor bracket to the vehicle, the first, second, and third apertures being aligned along a longitudinal centerline of the anchor bracket,
wherein the bracket includes a flange portion having a surface defining a plane, the first aperture and the second aperture extending through the surface defining the plane.

13. An apparatus for helping to protect occupants seated next to each other in seating of a vehicle, the apparatus comprising:
a first seatbelt for helping to protect an occupant seated in a first portion of the seating;
a second seatbelt for helping to protect an occupant seated in a second portion of the seating, the second seating portion being positioned adjacent the first seating portion; and
an anchor bracket for securing the first and second seatbelts in the vehicle, the anchor bracket comprising a first aperture for receiving the first seatbelt, a second aperture for receiving the second seatbelt, and a third aperture for receiving a fastener for securing the anchor bracket to the vehicle, the first, second, and third apertures being aligned along a longitudinal centerline of the anchor bracket, wherein the bracket includes a flange portion having a surface defining a plane, the first aperture and the second aperture extending through the surface defining the plane.

* * * * *